(12) United States Patent
Vishwanath (10) Patent No.: US 9,516,174 B1
(45) Date of Patent: Dec. 6, 2016

(54) PROVIDING TOLL-FREE DATA BASED ON A DEVICE LOCATION

(71) Applicant: Verizon Patent and Licensing Inc., Arlington, VA (US)

(72) Inventor: Karthik Vishwanath, Bangalore (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/823,458

(22) Filed: Aug. 11, 2015

(51) Int. Cl.
*H04W 4/24* (2009.01)
*H04M 15/00* (2006.01)

(52) U.S. Cl.
CPC ..... *H04M 15/8033* (2013.01); *H04M 15/8088* (2013.01); *H04M 15/8214* (2013.01)

(58) Field of Classification Search
CPC ................................................ H04M 15/8033
USPC ............................ 455/456.1–456.3, 406–408
See application file for complete search history.

(56) References Cited

U.S. PATENT DOCUMENTS

| | | | |
|---|---|---|---|
| 2012/0209753 A1* | 8/2012 | Hodges | H04L 12/146 705/30 |
| 2014/0120867 A1* | 5/2014 | Hodges | G06Q 30/00 455/406 |

OTHER PUBLICATIONS

U.S. Appl. No. 14/276,185, filed May 2014, Yin et al.

* cited by examiner

*Primary Examiner* — Michael T Vu (57) ABSTRACT

A device may receive registration information that identifies a target location associated with a toll-free data campaign. The device may receive location information that identifies device locations corresponding to mobile devices. The device may receive a resource identifier that identifies a resource requested by a mobile device. The device may determine, based on the location information, a device location associated with the mobile device. The device may determine, based on the resource identifier, the device location, and the target location, whether to provide toll-free access to the resource for the mobile device. The device may selectively provide toll-free access to the resource for the mobile device based on determining whether to provide toll-free access to the resource for the mobile device.

20 Claims, 6 Drawing Sheets

PROVIDING TOLL-FREE DATA BASED ON A DEVICE LOCATION

BACKGROUND

A toll-free telephone number may refer to a special telephone number that is free for the calling party, with the cost of the call instead being charged by the telephone carrier to the called party. Similarly, a toll-free data service may refer to a service where a network operator charges data usage (e.g., byte usage) to a service provider that provides the toll-free data service, rather than to an end user that uses the toll-free data service.

DETAILED DESCRIPTION OF PREFERRED EMBODIMENTS

The following detailed description of example implementations refers to the accompanying drawings. The same reference numbers in different drawings may identify the same or similar elements.

A toll-free data service may refer to a service where a network operator charges data usage (e.g., byte usage) to a service provider (e.g., a content provider) that provides the toll-free data service, rather than to an end user that uses a mobile device to access the toll-free data service. Since the content provider is paying for data usage, the content provider may want to provide the toll-free data service to particular mobile devices, rather than any mobile device (e.g., mobile devices associated with loyal customers, associated with users that are likely to provide revenue to the content provider, etc.). For example, the content provider may want to provide toll-free data service to mobile devices in a target location (e.g., a stadium, a theme park, etc.), such as a target location where a user is more likely to consume content or purchase goods or services. Furthermore, users may prefer to receive such content when the users are in the target location. Implementations described herein assist with providing location-based toll-free data services, which conserve network resources by providing toll-free data services to mobile devices in a target location.

Figure 1A:
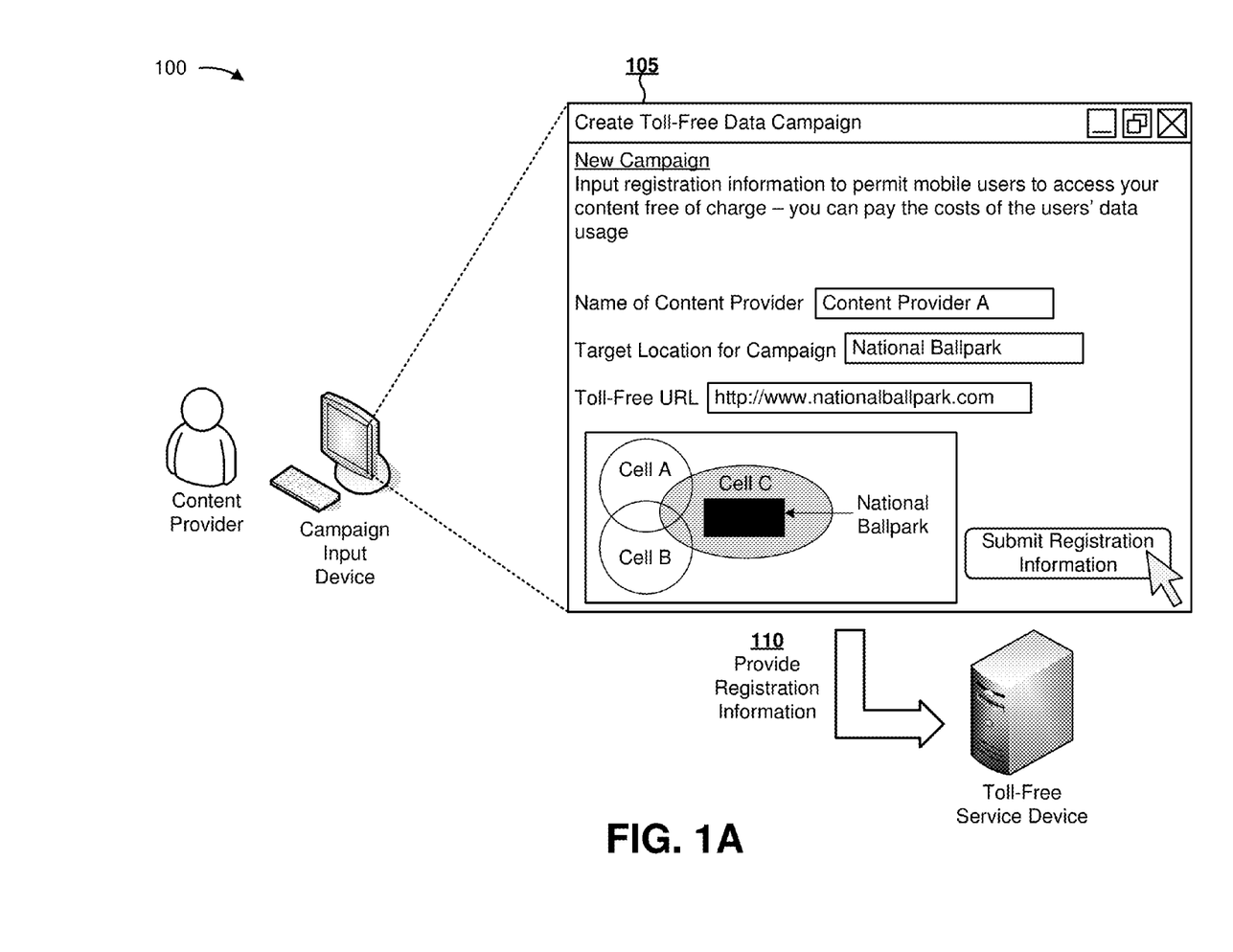
FIGS. 1A-1C are diagrams of an overview of an example implementation described herein.
Figure 1B:
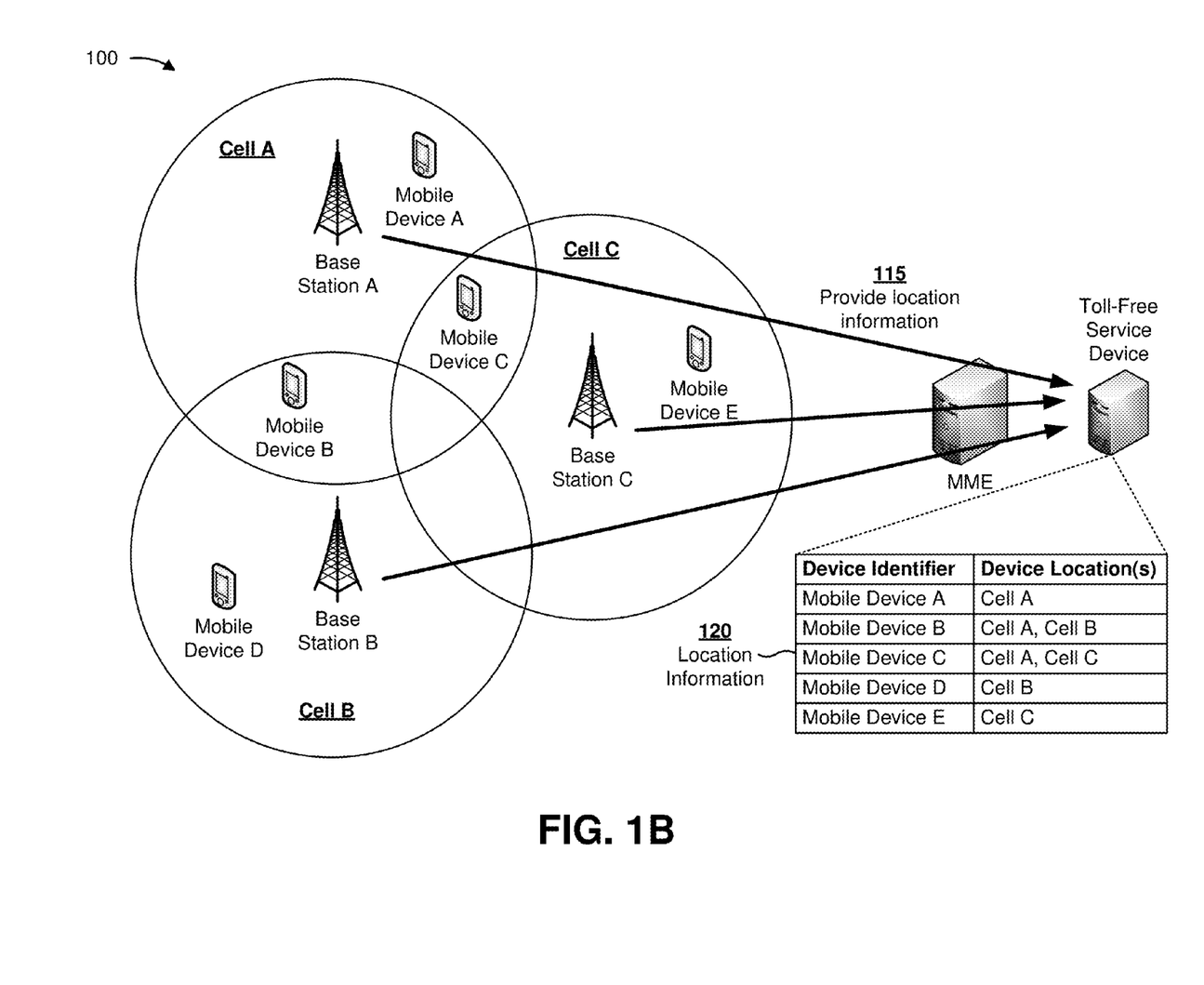
Figure 1C:
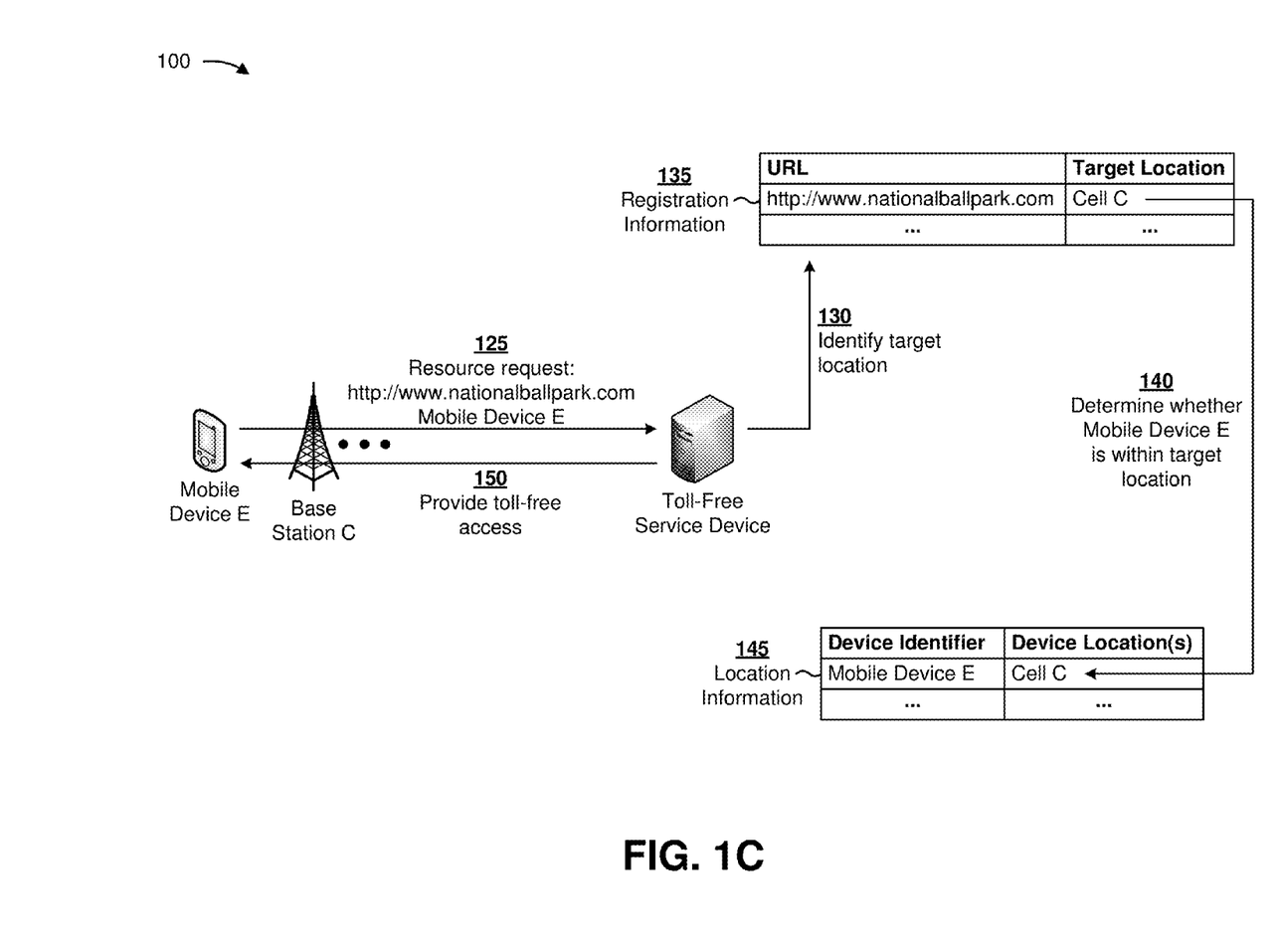

FIGS. 1A-1C are diagrams of an overview of an example implementation 100 described herein. As shown in FIG. 1A, a content provider may interact with a campaign input device (e.g., a computer) to input registration information for registering a toll-free data campaign. As shown by reference number 105, the content provider may interact with a user interface to input parameters of the toll-free data campaign. For example, the content provider may input a name of the content provider, shown as "Content Provider A," a target location for the toll-free data campaign, shown as "National Ballpark," and a toll-free resource identifier (e.g., a toll-free uniform resource locator (URL)), shown as "http://www.nationalballpark.com," via which mobile devices can access toll-free data.

In some implementations, the content provider may input a location parameter that identifies the target location, such as a set of geographic coordinates, a region identified on a map, or the like. As an example, and as shown, the user interface may provide a map that shows a location of National Ballpark relative to one or more cells associated with a network (e.g., a cellular network). In this case, assume that National Ballpark is located in a cell identified as "Cell C," so that Cell C is the target location for the toll-free data campaign. As shown by reference number 110, the registration information may be provided to a toll-free service device. In some implementations, the toll-free service device may determine a location parameter (e.g., a cell identifier) for the toll-free data campaign based on an input target location (e.g., National Ballpark), rather than the content provider providing the location parameter.

As shown in FIG. 1B, the toll-free service device may receive location information that identifies device locations corresponding to different mobile devices. For example, assume that a cellular network includes a first cell (shown as Cell A) served by a first base station (shown as Base Station A), a second cell (shown as Cell B) served by a second base station (shown as Base Station B), and a third cell (shown as Cell C) served by a third base station (shown as Base Station C). Assume that different mobile devices, shown as Mobile Device A through Mobile Device E, are located in different locations within the cells.

As shown by reference number 115, the base stations may provide location information to a mobility management entity device (MME), which may provide the location information to the toll-free service device. As shown by reference number 120, the toll-free service device may store the location information. For example, assume that the location information indicates that Mobile Device A is located in Cell A, that Mobile Device B is located in both Cell A and Cell B, that Mobile Device C is located in both Cell A and Cell C, that Mobile Device E is located in Cell B, and the Mobile Device E is located in Cell C. The toll-free service device may use the location information to determine whether to provide toll-free data to different mobile devices, as described below.

As shown in FIG. 1C, and by reference number 125, assume that the toll-free service device receives a request, from Mobile Device E (e.g., via Base Station C) for a resource identified by the URL http://www.nationalballpark.com. Based on receiving the request, the toll-free service device may identify a target location associated with the URL, as shown by reference number 130. For example, as shown by reference number 135, the toll-free service device may use the registration information (e.g., received as described above in connection with FIG. 1A) to determine that the URL in the request is associated with a target location of Cell C.

As shown by reference number 140, the toll-free service device may determine whether Mobile Device E is within the target location (e.g., whether Mobile Device E is located in Cell C). For example, as shown by reference number 145, the toll-free service device may use the location information (e.g., received as described above in connection with FIG. 1B) to determine that Mobile Device E is located in Cell C. Because Mobile Device E is located within Cell C, which is a target location for the toll-free data campaign that uses the URL http://www.nationalballpark.com, the toll-free service device may provide toll-free data from http://www.nationalballpark.com to Mobile Device E, as shown by reference number 150. In other words, the toll-free service device may charge the content provider, associated with the campaign, for data usage of Mobile Device E while accessing http://www.nationalballpark.com, rather than charging a user associated with Mobile Device E.

In this way, the toll-free service device provides toll-free data services to mobile devices based on a location of the mobile devices. This may be useful for content providers. Furthermore, by providing toll-free content to targeted mobile devices rather than all mobile devices, the toll-free service device conserves network resources.

Figure 2:
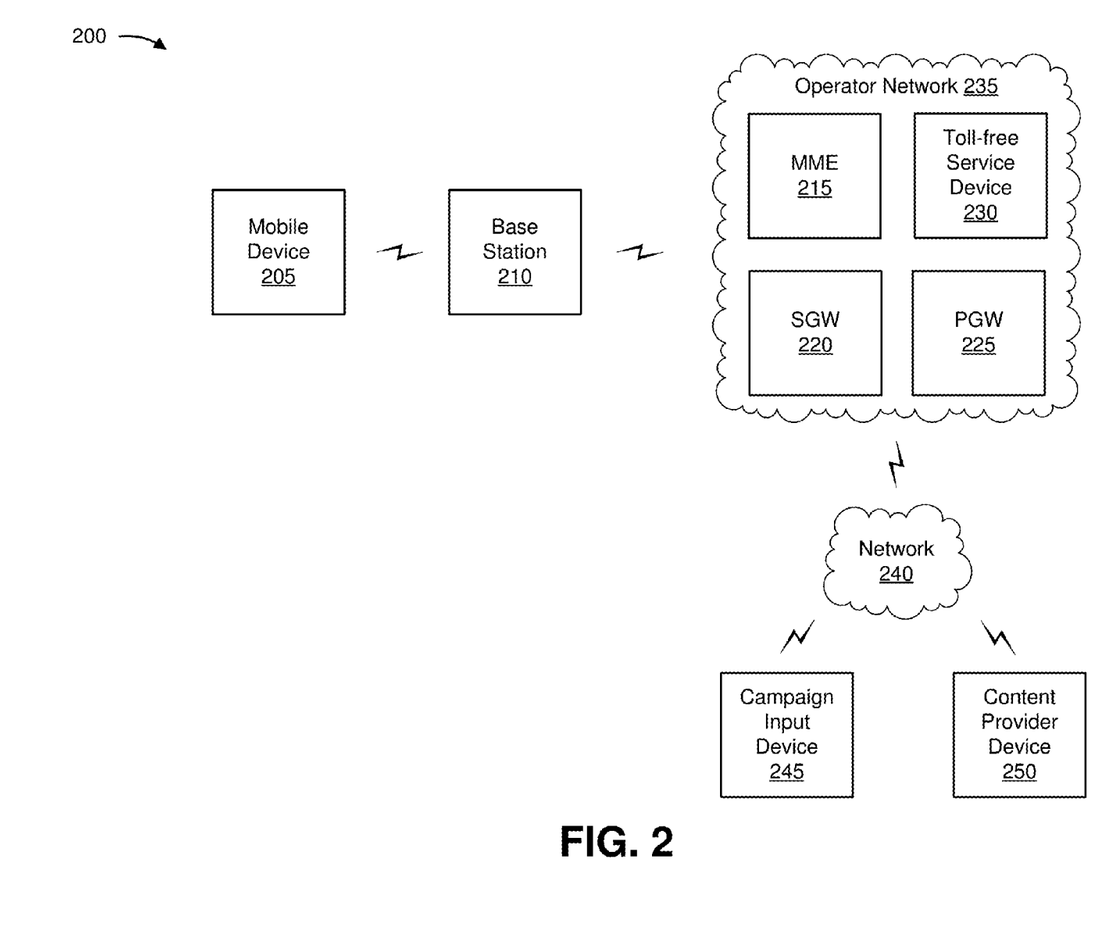
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a mobile device 205, a base station 210, a mobility management entity device (MME) 215, a serving gateway (SGW) 220, a packet data network gateway (PGW) 225, a toll-free service device 230, an operator network 235, a network 240, a campaign input device 245, and a content provider device 250. Devices of environment 200 may interconnect via wired connections, wireless connections, or a combination of wired and wireless connections.

Mobile device 205 may include one or more devices capable of communicating with base station 210 and/or a network (e.g., operator network 235, network 240, etc.). For example, mobile device 205 may include a mobile phone (e.g., a cellular phone, a smart phone, etc.), a tablet computer, or a similar type of device. Mobile device 205 may send traffic to and/or receive traffic from network 240 (e.g., via base station 210, SGW 220, and/or PGW 225).

Base station 210 may include one or more devices capable of transferring traffic, such as audio, video, text, and/or other traffic, destined for and/or received from mobile device 205. In some implementations, base station 210 may include an evolved node B (eNB) associated with a long term evolution (LTE) network that receives traffic from and/or sends traffic to network 240 via SGW 220 and/or PGW 225. Additionally, or alternatively, one or more base stations 210 may be associated with a radio access network (RAN) that is not associated with the LTE network. Base station 210 may send traffic to and/or receive traffic from mobile device 205 via an air interface. In some implementations, base station 210 may include a small cell base station, such as a base station of a microcell, a picocell, and/or a femtocell.

MME 215 may include one or more devices, such as one or more server devices, capable of managing authentication, activation, deactivation, and/or mobility functions associated with mobile device 205. In some implementations, MME 215 may perform operations relating to authentication of mobile device 205. Additionally, or alternatively, MME 215 may facilitate the selection of a particular SGW 220 and/or a particular PGW 225 to serve traffic to and/or from mobile device 205. MME 215 may perform mobility operations associated with managing mobility and/or location information associated with mobile device 205, such as handing off mobile device 205 from a first base station 210 to a second base station 210 when mobile device 205 is transitioning from a first cell associated with the first base station 210 to a second cell associated with the second base station 210. Additionally, or alternatively, MME 215 may select another MME (not pictured), to which mobile device 205 should be handed off (e.g., when mobile device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210, and may send the aggregated traffic to network 240 (e.g., via PGW 225) and/or other network devices. SGW 220 may also receive traffic from network 240 and/or other network devices, and may send the received traffic to mobile device 205 via base station 210. Additionally, or alternatively, SGW 220 may perform operations associated with handing off mobile device 205 to and/or from an LTE network.

PGW 225 may include one or more devices capable of providing connectivity for mobile device 205 to external packet data networks (e.g., network 240). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 240. Additionally, or alternatively, PGW 225 may receive traffic from network 240, and may send the traffic to mobile device 205 via SGW 220 and base station 210. In some implementations, PGW 225 may record data usage information (e.g., byte usage) for charging a user or a content provider.

Toll-free service device 230 may include one or more devices capable of managing a toll-free data service. For example, toll-free service device 230 may include a gateway, a router, a modem, a switch, a firewall, a NIC, a hub, a bridge, a server, an OADM, or a similar type of device. In some implementations, toll-free service device 230 may determine whether to provide toll-free service to mobile device 205. Additionally, or alternatively, toll-free service device may instruct another device regarding a party to charge for data usage associated with a provided service (e.g., a toll-free service charged to a content provider, a non-toll free service charged to a user, etc.).

Operator network 235 may include, for example, an evolved packet system (EPS) that includes an LTE network and/or an evolved packet core (EPC) that operate based on a third generation partnership project (3GPP) wireless communication standard. The LTE network may be a RAN that includes one or more base stations 210 via which mobile devices 205 communicate with the EPC. The EPC may include MME 215, SGW 220, PGW 225, toll-free service device 230, and/or other network device(s) that enable mobile devices 205 to communicate with network 240 and/or another network. The LTE network may include multiple base stations 210, and the EPC may include multiple MMEs 215, SGWs 220 and/or PGWs 225. Additionally, or alternatively, operator network 235 may include a cellular network, a public land mobile network (PLMN), a second generation (2G) network, a third generation (3G) network, a fourth generation (4G) network, a fifth generation (5G) network, and/or a similar type of network.

Network 240 may include one or more wired and/or wireless networks. For example, network 240 may include a cellular network (e.g., an LTE network, a 2G network, a 3G network, a 4G network, a 5G network, a code division multiple access (CDMA) network, etc.), a PLMN, a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

Campaign input device 245 may include one or more devices capable of receiving, generating, storing, processing, and/or providing registration information associated with a toll-free data service campaign. For example, campaign input device 245 may include a desktop computer, a laptop computer, a mobile phone, a server device, or a similar device.

Content provider device 250 may include one or more devices capable of providing content (e.g., to mobile devices 205). For example, content provider device 250 may include a server device (e.g., a content server, a host server, a web server, an application server, etc.) or a similar type of device. Content provider device 250 may be associated with a content provider that provides a toll-free data service, where the content provider is charged for data usage rather than an end user associated with mobile device 205.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
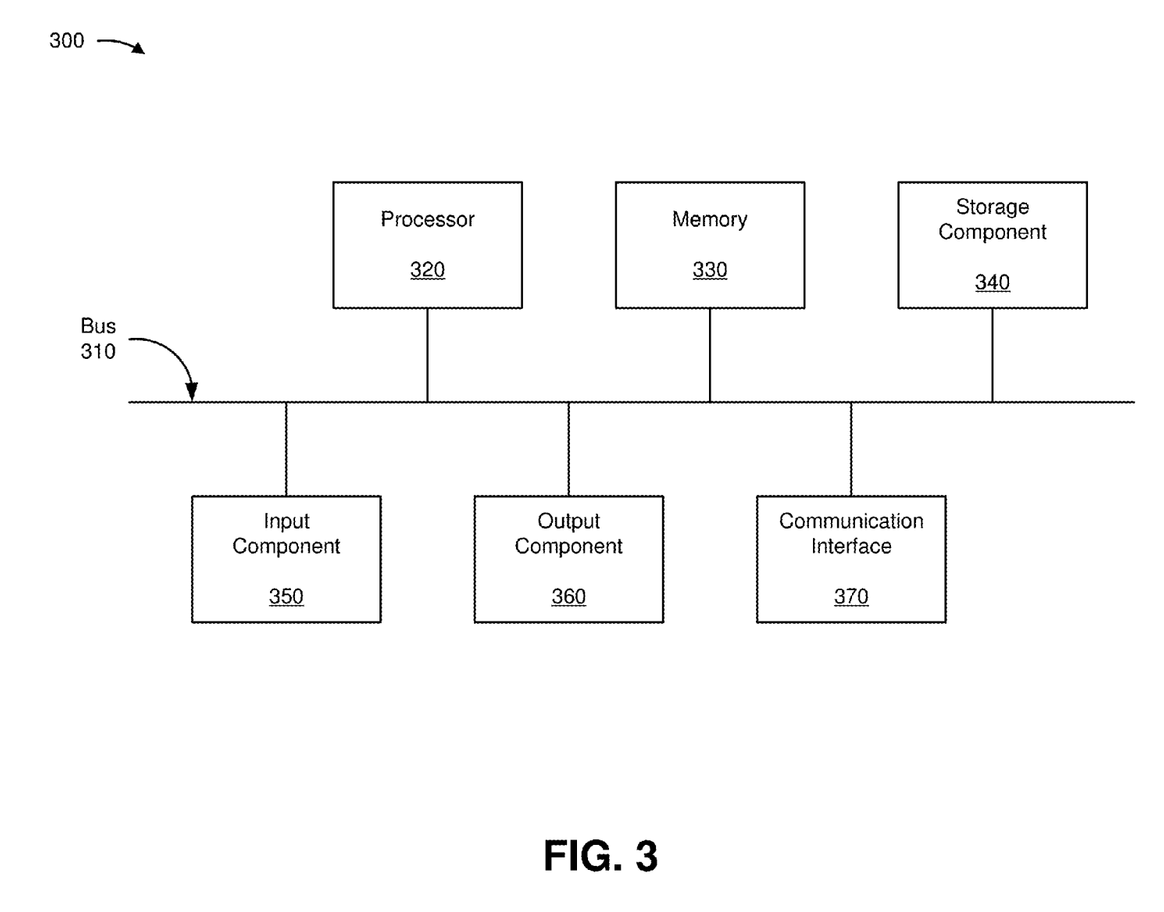
FIG. 3 is a diagram of example components of one or more devices of FIG. 2.

FIG. 3 is a diagram of example components of a device 300. Device 300 may correspond to mobile device 205, base station 210, MME 215, SGW 220, PGW 225, toll-free service device 230, campaign input device 245, and/or content provider device 250. In some implementations, mobile device 205, base station 210, MME 215, SGW 220, PGW 225, toll-free service device 230, campaign input device 245, and/or content provider device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors capable of being programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
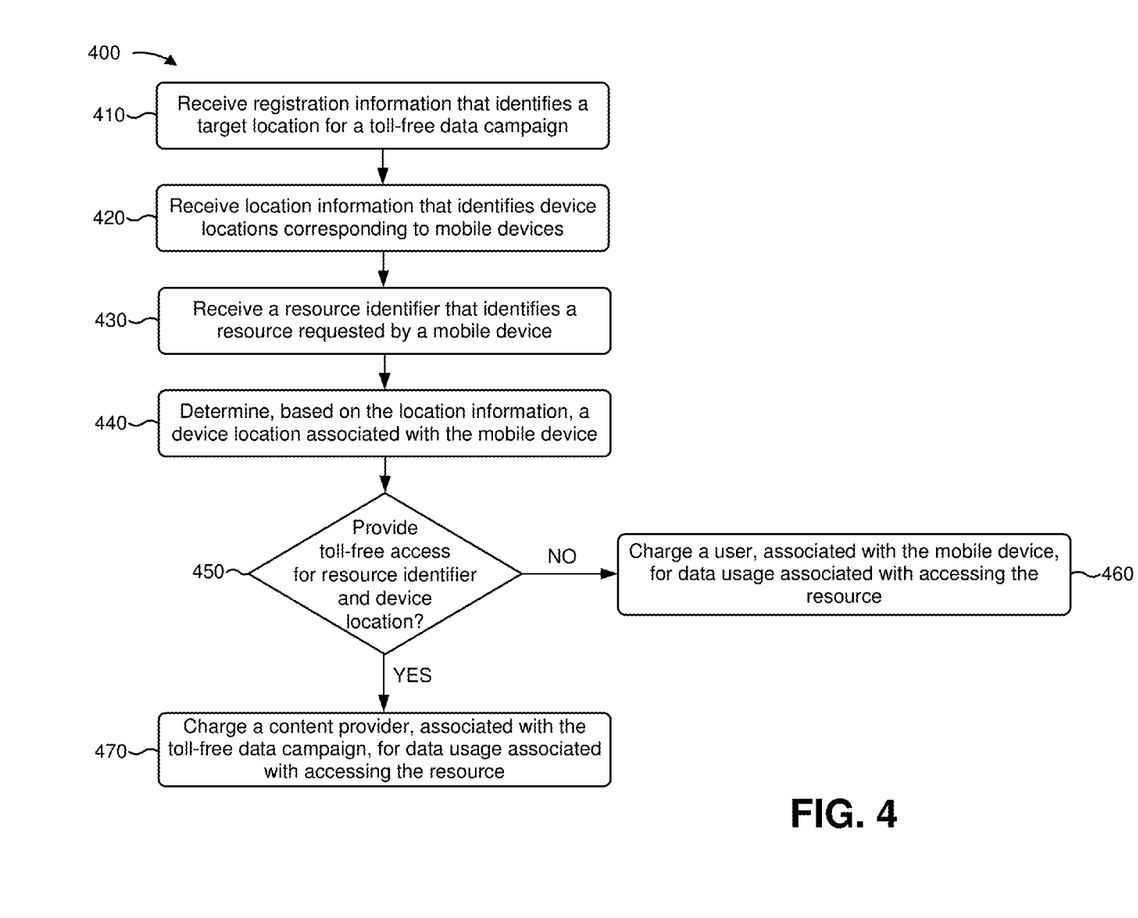
FIG. 4 is a flow chart of an example process for providing toll-free data based on a device location.

FIG. 4 is a flow chart of an example process 400 for providing toll-free data based on a device location. In some implementations, one or more process blocks of FIG. 4 may be performed by toll-free service device 230. In some implementations, one or more process blocks of FIG. 4 may be performed by another device or a group of devices separate from or including toll-free service device 230, such as mobile device 205, base station 210, MME 215, SGW 220, PGW 225, campaign input device 245, and/or content provider device 250.

As shown in FIG. 4, process 400 may include receiving registration information that identifies a target location for a toll-free data campaign (block 410). For example, toll-free service device 230 may receive registration information associated with a toll-free data campaign. A toll-free data campaign may refer to a campaign by a content provider where the content provider agrees to be charged for data usage by users of mobile devices 205 that access content provided by the content provider (e.g., rather than the users being charged for the data usage).

The registration information may include, for example, a toll-free resource identifier (e.g., a uniform resource identifier (URI), such as a uniform resource locator (URL), a uniform resource name (URN), etc.) associated with the toll-free data campaign. The toll-free resource identifier may identify a toll-free resource to be provided to mobile device 205 (e.g., where the content provider is charged for data usage associated with providing the toll-free resource to mobile device 205).

Additionally, or alternatively, the registration information may include information that identifies a target location (e.g., a target geographic location) associated with the toll-free data campaign. The target location may identify, for example, a geographic region (e.g., a target geographic region) for providing toll-free data to mobile device 205 when mobile device 205 is located within the geographic region. In some implementations, the geographic region may be identified using one or more location parameters. For example, a location parameter may include one or more geographic coordinates (e.g., that define a boundary for the geographic region), one or more cells (e.g., where the geographic region includes the one or more cells), or the like.

In some implementations, toll-free service device 230 may determine location parameter(s) based on registration information received from campaign input device 245. For example, a content provider may interact with campaign input device 245 to input a target location. In some implementations, the target location may include the location parameter(s). In some implementations, the target location may not include the location parameter(s), and toll-free service device 230 may determine the location parameter(s) based on the target location. For example, the target location may be a stadium, an arena, a park, a theme park, an attraction, a building, or another type of location. In this case, toll-free service device 230 may receive information that identifies the target location, and may determine the location parameter(s) based on the target location (e.g., by searching a data structure, by performing an Internet search, etc.). For example, the target location may be a theme park, and toll-free service device may determine one or more cells that serve a geographic region in which the theme park is located.

Additionally, or alternatively, the registration information may include a content provider identifier that identifies a content provider associated with a campaign, a content provider device identifier that identifies a content provider device 250 that provides content associated with a campaign, information that identifies a time period during which a campaign is valid, information that identifies an amount of data (e.g., in bytes) that the content provider will pay for during the campaign (e.g., a maximum amount of data), or the like.

As further shown in FIG. 4, process 400 may include receiving location information that identifies device locations corresponding to mobile devices (block 420). For example, toll-free service device 230 may receive location information associated with mobile devices 205. For example, the location information may identify device locations corresponding to mobile devices 205. A device location may indicate a geographic location of mobile device 205.

In some implementations, the device location may include one or more geographic coordinates that identify a geographic location of mobile device 205. For example, the geographic coordinates may be determined based on global positioning system (GPS) information associated with mobile device 205. In some implementations, the device location may identify a cell in which mobile device 205 is located. By using information that identifies a cell rather than GPS information, toll-free service device 230 conserves resources (e.g., processing resources, battery power, etc.) of mobile device 205. Furthermore, toll-free service device 230 may obtain information that identifies a cell from a network device (e.g., MME 215), rather than mobile device 205, further conserving resources of mobile device 205. Furthermore, by using information that identifies a cell for the device location, rather than GPS information, toll-free service device 230 may determine the device location when GPS information is unavailable (e.g., due to GPS being turned off on mobile device 205, due to GPS information being unavailable for mobile device 205, due to mobile device 205 not supporting GPS, etc.).

In some implementations, toll-free service device 230 may receive the location information from one or more network devices associated with operator network 235, such as base station(s) 210, MME(s) 215, or the like. As an example, MME 215 may receive location information, from base station(s) 210, to assist with managing mobility of mobile devices 205. In this case, the location information may include a mobile device identifier, that identifies mobile device 205, and a device location, associated with the mobile device identifier, that identifies a geographic region (e.g., a cell) associated with mobile device 205.

The mobile device identifier may include, for example, an international mobile subscriber identity (IMSI), an international mobile station equipment identity (IMEI), a mobile device number (MDN), a subscriber identifier that identifies a subscriber associated with mobile device 205, or the like. The device location may include, for example, a cell identifier, such as a cell global identity (CGI), an enhanced cell global identity (E-CGI), a local area code (LAC), or the like. As an example, base station 210 may be in communication with mobile device 205, and may provide an indication, to MME 215, that mobile device 205 is located in a coverage area (e.g., a cell) served by base station 210. Base station 210 may be associated with a cell identifier. MME 215 may store location information that indicates a relationship between a mobile device identifier, of mobile device 205 located in the cell, and the cell identifier. MME 215 may provide this location information to toll-free service device 230.

In some implementations, mobile device 205 may be located in multiple cells (e.g., cells served by base stations 210 with overlapping coverage areas). In this case, MME 215 may store information that indicates a relationship between a mobile device identifier, of mobile device 205, and multiple cell identifiers. MME 215 may store the location information in a data structure. Additionally, or alternatively, MME(s) 215 may provide the location information to toll-free service device 230, and toll-free service device 230 may store the location information (e.g., received from one or more MMEs 215) in a data structure. In some implementations, toll-free service device 230 may subscribe to receive updates to the location information from one or more MMEs 215.

As further shown in FIG. 4, process 400 may include receiving a resource identifier that identifies a resource requested by a mobile device (block 430). For example, toll-free service device 230 may receive, from mobile device 205 (e.g., via base station 210), a request to access a resource. The request may include, for example, a Hypertext Transfer Protocol (HTTP) request, a File Transfer Protocol (FTP) request, an access request, etc. The request may identify a resource using a resource identifier, such as a URI (e.g, a URL, a URN, etc.) via which the resource is accessible, a network address that identifies a device that provides the resource, etc. Additionally, or alternatively, toll-free service device 230 may receive a mobile device identifier (e.g., an IMSI, an IMEI, an MDN, etc.) that identifies mobile device 205 that is requesting the resource (e.g., requesting access to the resource).

As further shown in FIG. 4, process 400 may include determining, based on the location information, a device location associated with the mobile device (block 440). For example, toll-free service device 230 may determine a device location associated with mobile device 205 that is requesting the resource. In some implementations, toll-free service device 230 may use a mobile device identifier, included in the request and/or received from mobile device 205, to identify the device location.

In some implementations, toll-free service device 230 may identify the device location by searching a data structure that stores location information (e.g., received and/or stored as described above in connection with block 420). For example, toll-free service device 230 may use the mobile device identifier to search the data structure. The data structure may store information that associates the mobile device identifier with a location of mobile device 205 identified by the mobile device identifier. In this way, toll-free service device 230 may quickly identify a device location of mobile device 205, thereby conserving processing resources.

Additionally, or alternatively, toll-free service device 230 may identify the device location by providing the mobile device identifier to another device, which may search a data structure stored by and/or accessible to the other device. The other device may identify the device location, and may provide information that identifies the device location to toll-free service device 230.

As further shown in FIG. 4, process 400 may include determining, based on the resource identifier, the device location, and the target location, whether to provide toll-free access to the resource for the mobile device (block 450). For example, toll-free service device 230 may determine whether to provide mobile device 205 with toll-free access to the resource. In some implementations, toll-free service device 230 may determine whether to provide toll-free access based on the resource identifier included in the request from mobile device 205. For example, toll-free service device 230 may determine whether the resource identifier is a toll-free resource identifier. In other words, toll-free service device 230 may determine whether the resource identifier has been registered for a toll-free data campaign (e.g., whether the resource identifier is included in registration information). For example, toll-free service device 230 may determine whether the resource identifier or a portion of the resource identifier matches a toll-free resource identifier included in registration information.

Additionally, or alternatively, toll-free service device 230 may determine whether to provide toll-free access based on the device location. For example, toll-free service device 230 may determine whether the device location is within a geographic region identified by a target location (e.g., included in registration information). In some implementations, toll-free service device 230 may determine whether the device location matches the target location, is within the target location, or the like. In some implementations, toll-free service device 230 may identify a first cell that provides coverage for the target location, may identify a second cell associated with a base station in communication with mobile device 205, and may determine whether to provide toll-free access based on the first cell and the second cell. For example, toll-free service device 230 may determine to provide toll-free access when the first cell and the second cell are the same cell.

In some implementations, toll-free service device 230 may use the resource identifier, included in the request, to identify a target location associated with the resource identifier (e.g., when the resource identifier is a toll-free resource identifier and/or is included in registration information). For example, toll-free service device 230 may search a data structure of registration information, using the resource identifier, to identify the target location. Based on identifying the target location, toll-free service device 230 may determine whether the device location is within a geographic region identified by a target location. Toll-free service device 230 may selectively provide toll-free access to the resource for mobile device 205 based on determining whether to provide toll-free access, as described in more detail below.

As further shown in FIG. 4, if toll-free access is not to be provided (block 450—NO), then process 400 may include charging a user, associated with the mobile device, for data usage associated with accessing the resource (block 460). For example, if toll-free service device 230 determines that toll-free access is not to be provided (e.g., because the resource identifier is not a toll-free resource identifier and/or because the device location is not within a target location), then toll-free service device 230 may provide the resource to mobile device 205, and may charge a user, associated with mobile device 205, for data usage associated with accessing the resource by mobile device 205.

As an example, toll-free service device 230 may provide an instruction to PGW 225 to establish a traffic flow that charges mobile device 205 (e.g., and/or a user associated with mobile device 205) for data usage associated with the requested resource. PGW 225 may route traffic (e.g., packets) associated with the requested resource, may count a quantity of data (e.g., in bytes) used in association with the requested resource, and may provide data usage information (e.g., that identifies a quantity of data used) to another device (e.g., an authentication, authorization, and accounting (AAA) device). Additionally, or alternatively, toll-free service device 230 and/or PGW 225 may provide an instruction, to an AAA device, that causes that data usage information to be charged to mobile device 205.

In some implementations, if toll-free service device 230 determines that toll-free access is not to be provided, then toll-free service device 230 may provide user device 205 with instructions that indicate how to receive the resource toll-free. For example, toll-free service device 230 may provide information that identifies the target location, and user device 205 may provide this information for display. Additionally, or alternatively, toll-free service device 230 may provide directions (e.g., turn-by-turn directions) that indicate how to reach the target location. Additionally, or alternatively, toll-free service device 230 may provide, to user device 205, information that identifies the toll-free resource identifier.

As further shown in FIG. 4, if toll-free access is to be provided (block 450—YES), then process 400 may include charging a content provider, associated with the toll-free data campaign, for data usage associated with accessing the resource (block 470). For example, if toll-free service device 230 determines that toll-free access is to be provided (e.g., because the resource identifier is a toll-free resource identifier and because the device location is within a target location), then toll-free service device 230 may provide the resource to mobile device 205, and may charge a content provider, associated with the toll-free data campaign (e.g., associated with the toll-free resource identifier), for data usage associated with accessing the resource by mobile device 205.

As an example, toll-free service device 230 may provide an instruction to PGW 225 to establish a traffic flow that charges the content provider for data usage associated with the requested resource. PGW 225 may route traffic (e.g., packets) associated with the requested resource, may count a quantity of data (e.g., in bytes) used in association with the requested resource, and may provide data usage information (e.g., that identifies a quantity of data used) to another device (e.g., an authentication, authorization, and accounting (AAA) device). Additionally, or alternatively, toll-free service device 230 and/or PGW 225 may provide an instruction, to an AAA device, that causes that data usage information to be charged to the content provider.

In this way, the toll-free service device provides toll-free data services to mobile devices based on a location of the mobile devices, based on a preference of a content provider that pays for data usage associated with the toll-free data service. Furthermore, by providing toll-free content to targeted mobile devices rather than all mobile devices, the toll-free service device conserves network resources.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
 a processor to:
  receive registration information that identifies a target location, associated with a toll-free data campaign, and a resource identifier that identifies a resource associated with the toll-free data campaign;
  receive location information that identifies device locations corresponding to mobile devices;
  receive a request, including the resource identifier, from a mobile device;
  determine, based on the location information, a device location associated with the mobile device;
  determine that the resource identifier is associated with the toll-free data campaign;
  determine whether the device location matches the target location; and
  selectively provide toll-free access to the resource for the mobile device based on determining that the resource identifier is associated with the toll-free data campaign and whether the device location matches the target location.

2. The device of claim 1, where the processor is further to:
identify the target location using the resource identifier;
determine whether the device location matches the target location based on identifying the target location; and
where the processor, when selectively providing toll-free access to the resource, is to:
provide toll-free access to the resource when the device location matches the target location.

3. The device of claim 1, where the processor is further to:
receive a mobile device identifier that identifies the mobile device; and
where the processor, when determining the device location, is to:
determine the device location using the mobile device identifier.

4. The device of claim 1, where the device location includes a cell identifier that identifies a cell, of a network via which the toll-free data campaign is deployed, in which the mobile device is located.

5. The device of claim 1, where the processor is further to:
identify one or more first cells that provide coverage for the target location;
where the processor, when determining the device location, is to:
identify one or more second cells in which the mobile device is located; and
where the processor, when selectively providing toll-free access, is to:
selectively provide toll-free access based on the one or more first cells and the one or more second cells.

6. The device of claim 1, where the processor, when receiving the location information, is to:
receive the location information from one or more network devices that manage mobility operations for the mobile devices.

7. The device of claim 1, where the target location is associated with a geographic region, and
where the processor, when determining whether the device location matches the target location, is to:
determine whether the device location is within the geographic region associated with the target location; and
determine, when the device location is within the geographic region, that the device location matches the target location.

8. A non-transitory computer-readable medium storing instructions, the instructions comprising:
one or more instructions that, when executed by one or more processors, cause the one or more processors to:
receive registration information that identifies a target geographic location, associated with providing toll-free data, and a resource identifier that identifies a resource associated with providing the toll-free data;
receive location information that identifies a plurality of device locations corresponding to a plurality of mobile devices;
receive a request, including the resource identifier, provided by a mobile device of the plurality of mobile devices;
determine, based on the location information, a device location, of the plurality of device locations, associated with the mobile device;
determine that the resource identifier is associated with providing the toll-free data;
determine whether the device location matches the target geographic location; and
selectively provide the mobile device with toll-free access to the resource based on determining that the resource identifier is associated with providing the toll-free data and whether the device location matches the target geographic location.

9. The non-transitory computer-readable medium of claim 8, where the one or more instructions, that cause the one or more processors to determine whether the device location matches the target geographic location, cause the one or more processors to:
determine that the device location does not match the target geographic location based on identifying the target geographic location; and
cause a subscriber, associated with the mobile device, to be charged for data usage associated with accessing the resource based on determining that the device location does not match the target geographic location.

10. The non-transitory computer-readable medium of claim 8, where the one or more instructions, further cause the one or more processors to:
receive a mobile device identifier that identifies the mobile device; and
where the one or more instructions, that cause the one or more processors to determine the device location, cause the one or more processors to:
determine the device location based on the location information and the mobile device identifier.

11. The non-transitory computer-readable medium of claim 8, where the one or more instructions, that cause the one or more processors to determine whether the device location matches the target geographic location, cause the one or more processors to:
determine that the device location matches the target geographic location; and
where the one or more instructions, that cause the one or more processors to selectively provide the mobile device with toll-free access, cause the one or more processors to:
provide the mobile device with toll-free access based on determining that the device location matches the target geographic location.

12. The non-transitory computer-readable medium of claim 11, where the one or more instructions, that cause the one or more processors to provide the mobile device with toll-free access, cause the one or more processors to:
provide the mobile device with access to the resource; and
provide an instruction to charge a content provider, identified in the registration information, for data usage associated with providing the mobile device with access to the resource.

13. The non-transitory computer-readable medium of claim 8, where the one or more instructions further cause the one or more processors to:
receive another request, including another resource identifier, provided by the mobile device; and
determine that the other resource identifier is not associated with a toll-free resource identifier included in the registration information;
where the one or more instructions, that cause the one or more processors to selectively provide the mobile device with toll-free access, cause the one or more processors to:
prevent the mobile device from being provided with toll-free access to the other resource based on determining that the other resource identifier is not associated with a toll-free resource identifier included in the registration information.

14. The non-transitory computer-readable medium of claim 13, where the one or more instructions, that cause the one or more processors to prevent the mobile device from being provided with toll-free access to the other resource, cause the one or more processors to:
provide the mobile device with access to the other resource; and
provide an instruction to charge a subscriber, associated with the mobile device, for data usage associated with providing the mobile device with access to the other resource.

15. A method, comprising:
receiving, by a device, registration information that identifies a target geographic region in which toll-free data is to be provided and a resource identifier that identifies a resource for which toll-free data is to be provided;
receiving, by the device, location information that identifies a plurality of device locations corresponding to a plurality of mobile devices;
receiving, by the device, a request, including the resource identifier, provided by a mobile device of the plurality of mobile devices;
determining, by the device and based on the location information, a device location, of the plurality of device locations, associated with the mobile device;
determining, by the device, that the resource identifier identifies the resource for which toll-free data is to be provided;
determining whether the device location is within the target geographic region; and
selectively providing, by the device, toll-free access to the resource, for the mobile device, based on whether the device location is within the target geographic region.

16. The method of claim 15, further comprising:
determining that the device location is within the target geographic region based on identifying the target geographic region; and
where selectively providing toll-free access comprises:
providing toll-free access based on determining that the device location is within the target geographic region.

17. The method of claim 15, further comprising:
receiving a mobile device identifier that identifies the mobile device; and
where determining the device location comprises:
determining the device location using the location information and the mobile device identifier.

18. The method of claim 15, further comprising:
determining that the device location is not within the target geographic region;
providing access to the resource; and
causing a subscriber, associated with the mobile device, to be charged for data usage associated with accessing the resource.

19. The method of claim 15, where the device location includes a cell identifier that identifies a cell of a base station in communication with the mobile device.

20. The method of claim 15, further comprising:
identifying a first cell that provides coverage for the target geographic region;
identifying a second cell associated with a base station in communication with the mobile device;
determining that the first cell and the second cell are a same cell; and
where selectively providing to provide toll-free access to the resource comprises:
selectively providing toll-free access based on determining that the first cell and the second cell are the same cell.

* * * * *